United States Patent [19]

Bernier

[11] Patent Number: 4,731,438

[45] Date of Patent: Mar. 15, 1988

[54] WATER TREATMENT METHOD FOR RESIN IN A PURGE VESSEL

[75] Inventor: Robert J. N. Bernier, Flemington, N.J.

[73] Assignee: Union Carbide Corporation, Danbury, Conn.

[21] Appl. No.: 947,875

[22] Filed: Dec. 30, 1986

[51] Int. Cl.⁴ .............................................. C08F 6/02
[52] U.S. Cl. ................................... 528/483; 528/499
[58] Field of Search ............... 523/315, 330; 528/483, 528/499, 502

[56] References Cited

U.S. PATENT DOCUMENTS

| | | | |
|---|---|---|---|
| 2,918,461 | 12/1959 | Flynn | 528/499 |
| 4,029,877 | 6/1977 | Yoshiura et al. | 528/499 X |
| 4,278,788 | 7/1981 | Hatfield et al. | 528/483 X |
| 4,314,053 | 2/1982 | Lin et al. | 528/483 |
| 4,332,933 | 6/1982 | DiDrusco et al. | 528/499 X |
| 4,372,758 | 2/1983 | Bobst et al. | 528/483 X |

FOREIGN PATENT DOCUMENTS

| | | | |
|---|---|---|---|
| 0205910 | 1/1984 | Fed. Rep. of Germany | 523/315 |
| 0213726 | 11/1985 | Japan | 528/483 |

*Primary Examiner*—Joseph L. Schofer
*Assistant Examiner*—F. M. Teskin
*Attorney, Agent, or Firm*—Clement J. Vicari

[57] ABSTRACT

The deactivation of Ziegler-Natta catalyst and organometallic cocatalyst residues present in the olefin polymer resins produced by the fluidized bed polymerization process is accomplished in a purge vessel by contacting the olefin polymer resin with an inert purge gas containing water the latter being present in said inert purge gas in an amount to establish and maintain a moisture front region in the resin bed of said purge vessel as to create a region above said moisture front substantially free of water and wherein deactivation of said catalyst and cocatalyst are effected in said moisture front region.

8 Claims, 6 Drawing Figures

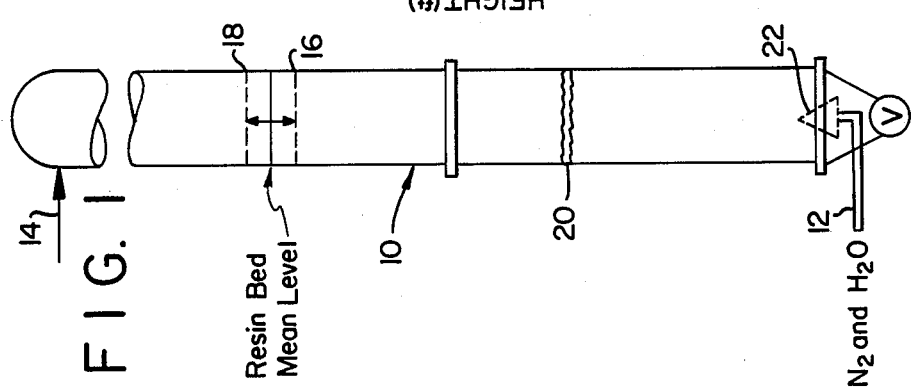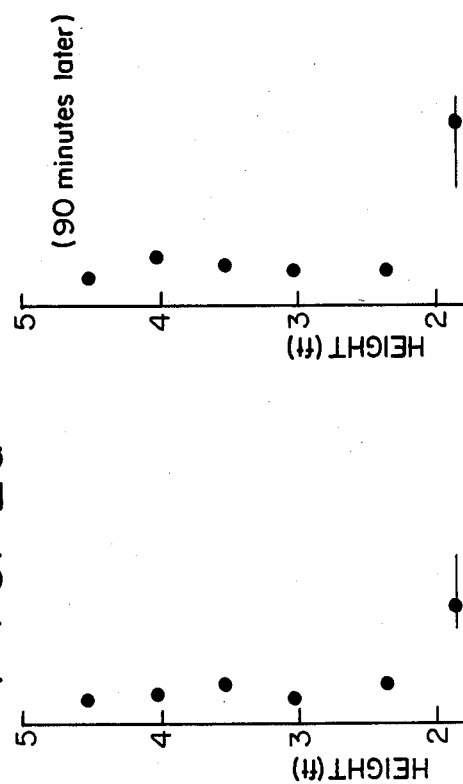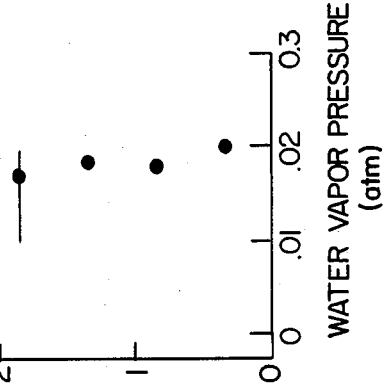

WATER TREATMENT METHOD FOR RESIN IN A PURGE VESSEL

BACKGROUND OF THE INVENTION

1 Field of the Invention

The present invention relates to a water treatment method for olefin polymer resins and more particularly to a method for deactivating Ziegler catalyst residues and cocatalysts comprising organometallic compounds of Group I to III of the Periodic Table of elements present in olefin polymer resins.

2 Description of the Prior Art

It has long been known that olefins such as ethylene can be polymerized by contacting them under polymerization conditions with a catalyst comprising a transition metal compound, e.g., titanium tetrachloride and a cocatalyst or activator, e.g., an organometallic compound such as triethyl aluminum. Catalysts of this type are generally referred to as Ziegler catalysts and will be referred to as such throughout this specification.

Low density ethylene polymers (i.e. ethylene polymers having a density of about 0.94 g/cc and lower) have in the past been made commercially by a high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly assigned, U.S. Pat. No. 4,302,565, the disclosure of which is hereby incorporated herein by reference. Ethylene polymers made by such a low pressure process may be formed into film by known techniques and such film is extremely tough and is useful in packaging applications.

The above-identified patent discloses a low pressure, gas phase process for producing low density ethylene copolymer having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ to $C_8$ alpha-olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is also meant to include polymers of ethylene with 2 or more comonomers) thus prepared are copolymers of predominantly (at least about 90 mole percent) ethylene and a minor portion (not more than 10 mole percent) of one or more $C_3$ to $C_8$ alpha-olefin hydrocarbons which should not contain any branching on any of their carbon atoms which is closer than the fourth carbon atom. Examples of such alpha-olefin hydrocarbons are propylene, butene-1, hexene-1, 4-methyl pentene-1 and octene-1.

The catalyst may be prepared by first preparing a precursor from a titanium compound (e.g., $TiCl_4$), a magnesium compound (e.g., $MgCl_2$) and an electron donor compound (e.g., tetrahydrofuran) by, for example, dissolving the titanium and magnesium compounds in the electron donor compound and isolating the precursor by crystallization. A porous inert carrier (such as silica) is then impregnated with the precursor such as by dissolving the precursor in the electron donor compound, admixing the support with the dissolved precursor followed by drying to remove the solvent. The resulting impregnated support may be activated by treatment with an activator compound (e.g., triethyl aluminum).

The polymerization process can be conducted by contacting the monomers, in the gas phase, such as in a fluidized bed, with the activated catalyst at a temperature of about 30° C. to 105° C. and a low pressure of up to about 1000 psi (e.g., from about 150 to 350 psi).

The resulting granular polymers may contain gaseous unpolymerized monomers including hydrocarbon monomers. These gaseous monomers should be removed from the granular resin for safety reasons, since there is a danger of explosion if the hydrocarbon monomer concentration becomes excessive in the presence of oxygen. In addition, proper disposal of the hydrocarbon is required in order to meet environmental standards concerning hydrocarbon emissions.

The prior art teaches techniques for removing volatile unpolymerized monomers from polymers of the corresponding monomers. See for example, U.S. Pat. Nos. 4,197,399, 3,594,356, and 3,450,183.

More recently U.S. Pat. No. 4,372,758 issued Feb. 8, 1983 to R. W. Bobst et al and which is assigned to a common assignee discloses, a degassing or purging process for removing unpolymerized gaseous monomers from solid olefin polymers. The purging process generally comprises conveying the solid polymer (e.g., in granular form) to a purge vessel and contacting the polymer in the purge vessel with a countercurrent inert gas purge stream to strip away the monomer gases which are evolved from the polymer.

Unfortunately however in the process for producing polyethylene and polypropylene using Ziegler-Natta catalyst, catalyst and cocatalyst residues in resin entering the purge vessel are not deactivated by countercurrent purging with an inert gas stream as described above. These residues react with air and moisture on exiting the purge vessel and form alcohols, aldehydes, ketones, and alkanes. The alcohols, aldehydes, and ketones formed by reaction with oxygen contribute to resin odor. The alkanes formed by reaction with water require proper disposal in order to meet environmental standards concerning hydrocarbon emissions. In addition, the gaseous hydrocarbon products should be removed from the resin for safety reasons, since there is danger of explosion if the hydrocarbon concentration becomes excessive in the presence of oxygen.

The art has resorted to a moisture treatment of resin prior to exposing the catalyst and cocatalyst residues in the resin to the atmosphere (oxygen) which led to the addition of steam to the inert gas purge stream. The excess moisture required to drive the hydrolysis reaction toward completion was carried out in the vent stream from the top of the purge bin. The presence of moisture was not a concern when the purge bin vent stream was routed to a flare, but presented problems when the vent stream was sent to a monomer recovery unit. Removal of moisture from the purge bin vent stream was required to avoid monomer recovery unit processing problems such as condenser icing and to avoid recycle of moisture with monomer to the reactor which adversely affects catalyst productivity and resin product properties.

One solution for eliminating moisture from the purge bin vent stream was a dual molecular sieve bed drying system that required frequent regeneration with high temperature nitrogen plus a blower to overcome the pressure drop of the purge bin vent stream through the sieve bed. When high levels of moisture addition to the purge bin were required, this solution became unattractive due to limitations on molecular sieve bed size resulting in impractical regeneration frequencies and high regeneration nitrogen supply requirements.

Another solution for eliminating moisture from the purge bin vent stream was the use of two separate bins. One bin was used for dry inert gas purging of residual monomers from the resin with the vent from this bin routed to a monomer recovery unit. The second bin was used for moisture treatment of the resin with the vent from this bin routed to a flare. This solution became commercially unattractive due to the cost and increased space required to either increase the purge bin structure height to accommodate gravity flow of resin between bins or add conveying facilities to transfer resin from one bin to the other bin in a separate structure.

Other techniques for deactivating catalysts residue from polymer resins are disclosed for example in U.S. Pat. Nos. 4,029,877 issued Jun. 14, 1977; 4,314,053 issued Feb. 2, 1982 and British Patent No. 1,553,565 issued Oct. 3, 1979. These patents disclose the deactivation of the catalyst residues by utilization of water which reacts with the catalyst residues rendering them inactive. Unfortunately however the water treatment disclosed therein has the disadvantage that the monomers present in the polymer resin particles are subject to poisoning and require separate removal steps to remove the water from the monomer.

SUMMARY OF THE INVENTION

Broadly contemplated, the present invention provides a method for deactivating Ziegler-Natta catalysts and organometallic cocatalyst residues present in olefin polymer resins produced by the fludized bed polymerization process which comprises conveying said olefinic polymer resins to a purge vessel in an inert gas stream to form a resin bed in said purge vessel, maintaining said resin bed substantially constant in said purge vessel, introducing an inert purge gas containing water into said purge vessel, said water present in said purge gas being in an amount sufficient to maintain a moisture front region in said resin bed whereby above said moisture front region the purge gas is substantially free of water and below said moisture front region the amount of water present in said purge gas is substantially equal to the amount of water present in said purge gas introduced in said purge vessel, and wherein deactivation of said catalyst and cocatalyst residues are effected in said moisture front region.

BRIEF DESCRIPTION OF THE DRAWINGS

FIG. 1 illustrates a portion of a purge vessel for conducting the water treatment.

FIGS. 2a and 2b show water vapor partial pressure profiles in the carrier gas measured along and above the resin bed at two different time intervals and are correlated against the height of the resin bed shown in FIG. 1.

DESCRIPTION OF THE PREFERRED EMBODIMENTS

Figure 3:
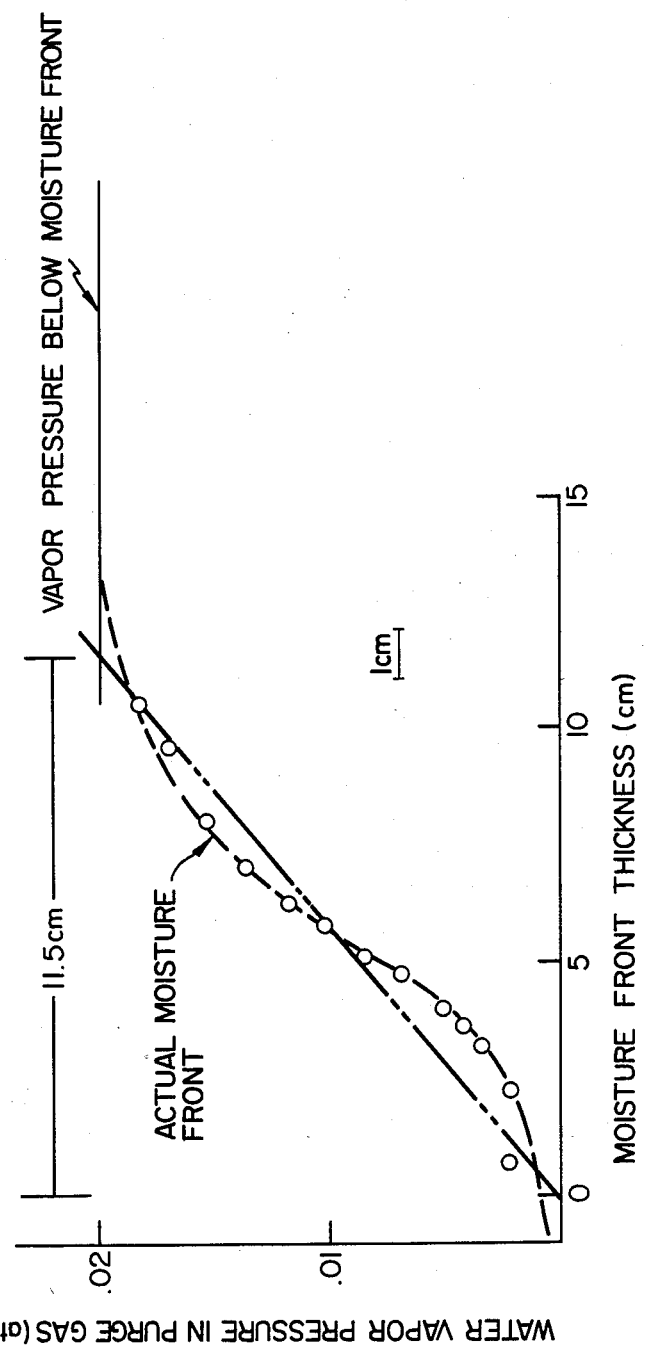
FIG. 3 shows the boundaries of the established moisture front.

For purposes of ease of description only, the present invention will be described herein with reference to low pressure-low density ethylene copolymers, although it is to be expressly understood that the invention is not to be limited thereby. Rather, it is the intention to be limited only by the scope of the claims appended hereto. For example, the process of the present invention may be employed to treat solid olefin polymers other than low pressure-low density ethylene copolymers, such as homopolymers of ethylene and propylene and other copolymers of ethylene and propylene.

As used herein, the language "low pressure-low density ethylene copolymers" means copolymers of at least about 90 mole percent ethylene with no more than about 10 mole percent of at least one $C_3$ to $C_8$ alpha-olefin hydrocarbon comonomer (e.g., propylene, butene-1, hexene-1, 4-methyl pentene-1 and octene-1) which are copolymerized under low pressure (e.g., 150 to 350 psi). Such copolymers normally have a density no greater than about 0.94 g/cc and typically their density is from about 0.91 to about 0.94 g/cc. In addition, such copolymers generally have a narrow molecular weight distribution range (Mw/Mn) of about 2.7 to 4.5. A specific example of one method for preparing such copolymers is more fully described in the aforementioned U.S. Pat. No. 4,302,565 reference may be made to such applications for a more complete disclosure. The gas phase process disclosed in those applications produces granular polymers which may have an average particle diameter on the order of about 0.03 to about 0.05 inch.

Depending upon the conditions of reaction and the particular hydrocarbon comonomer, the resulting solid low pressure-low density ethylene copolymers may contain an amount of gaseous unpolymerized monomers (which may include ethylene, one or more of the hydrocarbon comonomers, saturated hydrocarbons and non-reactive hydrocarbon olefins) which may be as high as about 1.5 to 4.5 weight percent. Environmental restrictions may prevent the direct venting to the atmosphere of such hydrocarbons and more importantly, safety considerations generally require the hydrocarbon content to be reduced to avoid the formation of an explosive mixture upon contact with oxygen.

In addition, the solid resin particles contain amounts of catalyst and cocatalyst residues which as mentioned previously should be deactivated so as not to impart discoloration and offensive odor to the polymer resins. Advantageously the removal of the monomers and, deactivation of the catalyst residues and cocatalyst can be accomplished by the practice of the instant invention in a single purge vessel without the need for a separate treatment of the monomers as required by the prior art.

The conditions of operation for removing the monomer gases and the equipment utilized are similar to the process described in the aforementioned U.S. Pat. No. 4,372,758 except that the equipment is modified to permit water feeding of the inert gas stream feed to the bottom of the purge vessel.

The process of the present invention is preferably applied to the deactivation of catalyst residues present in polymers obtained using the catalyst and cocatalyst according to U.S. Pat. No. 4,302,565.

Referring specifically to FIG. 1 of the drawing, there is illustrated a portion of a purge tank or vessel 10 which can be provided with conventional dust collectors (not shown). An inert gas purge and water is fed via stream 12 to the bottom of purge vessel 10 and a solid resin is conveyed in an inert gas via stream 14 to the top thereof. The resin is fed to the purge vessel 10 and the purge vessel is designed such that the resin flows downwardly through the vessel in substantially plug flow fashion. By "plug flow" is meant equal movement of the resin particles throughout a cross-section of the purge vessel such that all of the resin particles have a substantially equal residence time in the vessel.

The inert gas-water mixture entering the purge vessel is directed upward and water vapor progresses toward the direction of the surface of the bed 16, 18 as a wave front. The moisture front indicated by reference numeral 20 is a spatial boundary with negligible thickness compared to the bed height. Below this front, the water concentration in the carrier gas is nearly equal to its inlet value while above, the carrier gas is practically free of water.

The moisture front can be advantageously exploited to reconcile the use of a monomer recovery system and the superposition of the resin water treatment and the resin devolatilization process. It has been found that by actively modulating the water injection rate or matching a fixed but unique injection rate to the production rate, this moisture front can be stabilized to a predetermined location or region inside the resin bed. Under this mode of operation, two distinct zones are created. Below the moisture front, the water concentration is substantially equal to that of the mixture injected at the bottom of the purge bin while above the moisture front, the purge gas is free of water or contains water at low concentrations which are within the recovery process tolerances.

The addition of water to the purge gas can be effected either by the humidification of the purge gas such as by bubbling the purge gas through a bath of water or alternatively by direct injection of steam into the purge gas prior to entry into the purge vessel. The purge gas water concentration is only limited by the water vapor saturation pressure at the gas mixture temperature.

Conventional materials handling equipment and techniques may be employed in the process of the present invention. It is preferred, however, to use a purge vessel which has a conical-shaped bottom as shown schematically in the drawings. In this case, in order to obtain the preferred plug flow of resin, it may be necessary to utilize an inverted conical insert or other means inside the bottom of the purge vessel. The height of this insert may be adjusted in order to provide the desired effect. Such inserts are commercially available. The purpose of the dust collectors, which are also preferred, is to prevent the resin particles from being carried out of the top of the purge vessel with the exiting purge gas. Conventional dust collectors, such as commercially-available bag filters, may be employed. Similarly, conventional coolers and blowers may be employed to provide the necessary materials handling capability and to control the temperature and pressure of resin and purge gas.

The temperature of the resin in the purge vessel is not critical and is normally dependent upon the temperature at which it is obtained from the polymerization reaction. However, the resin temperature affects the residence times as discussed below. In the case of low pressure-low density ethylene copolymers, the resin may be obtained in the form of solid particles directly from the polymerization reaction at a temperature of about 80°–85° C. It is economically desirable not to add additional heat to the resin before feeding same to the purge vessel. It is also necessary to keep the resin temperature lower than its softening or melting point which in the case of low pressure-low density ethylene copolymers is about 100°–110° C. As indicated above, the higher the temperature in the purge vessel, the higher the rate of diffusion of the monomer gases from the solid to the purge gas. However, economic considerations may prevent additional heat from being added to the resins. Satisfactory results can be obtained by directly feeding the resin at its reaction temperature to the purging operation, even considering the fact that its temperature may decrease or increase slightly due to the temperature of the conveying gas.

The inert purge gas is preferably fed to the bottom of the purge vessel at ambient temperature although any temperature up to about the temperature of the resin is acceptable. It is also preferred to provide a low pressure in the purge vessel since the rate of gaseous monomer diffusion is higher at lower pressures. It is however also preferred to maintain a positive pressure in the purge vessel and to avoid a vacuum since any vacuum may have the effect of drawing into the system air or oxygen which would create safety problems in view of the explosive nature of the hydrocarbon monomers oxygen mixture. Although the proper pressure depends on many factors, those skilled in the art are capable of making that determination using known mass transfer techniques. In the case of low pressure-low density ethylene copolymers, the pressure of the purge gas fed to the bottom of the purge vessel is preferably about 1 psig although it may be as high as 15 psig or greater.

It is also preferable to provide as uniform a flow of purge gas through the vessel as possible. To achieve this, it may be necessary to provide a plurality of uniformly-spaced openings or other flow distribution devices in the bottom of the purge vessel for feeding the purge gas. Most preferably however, the purge gas is directed to the base of cone 22 and the gas-water mixture flares outwardly from the base and into the purge vessel. In addition, it is preferred to feed the purge gas through the vessel at or above a minimum of velocity in order to obtain a more uniform distribution of purge gas. For purposes of the present invention, it is preferred to feed the purge gas through at a rate of at least about 1 linear foot per minute.

The rate of flow of resin through the purge vessel is not critical and depends upon the minimum residence time necessary to reduce the concentration of gaseous monomers in the resin to the desired level. It is preferred to reduce the hydrocarbon monomer gas content in the resin to below about 25–50 parts per million by weight, although the extent to which the hydrocarbon monomer concentration must be reduced depends upon both environmental and safety requirements. In any event, the purging process of the present invention is effective to substantially reduce the hydrocarbon residues dissolved in the low pressure-low density ethylene copolymer resins and to deactivate the catalyst and cocatalyst the latter normally taking about 5 to 10 minutes.

The water present in the purge gas must be sufficient to deactivate the catalyst residues and not in an amount which would poison the monomers. The amount of water injected and the purge gas flow rate must be calibrated or regulated so that a moisture front region is created in which the deactivation of the catalyst and cocatalyst residues takes place. Thus merely as illustrative, when resin is continuously fed at a rate of 16.4 kg/hf, a purge gas flow rate of 9 g/min., atmospheric pressure, having a water partial pressure of 0.02 atm is sufficient to create and stablize a moisture front in the resin bed. FIGS. 2a and 2b show the water vapor pressure profile measured along the resin bed at two different time intervals. The discontinuity in the water vapor concentration is indicative of the presence of a moisture front which detailed structure is shown in FIG. 3. The purge gas effluent dew point was $-67°$ C.

As mentioned previously, above the moisture front region the concentration in the purge gas is substantially free of water and below the moisture front region the amount of water present in the purge gas is substantially equal to the amount of water present in the purge gas introduced in the reactor. These characteristics may be utilized to determine the purge gas flow rate and quantity of water required at a particular temperature to maintain and stablize the moisture front. The change in the species of residual volatiles observed in resin samples taken above and below the moisture front are indicative of the presence of the moisture front. Residual volatiles found in resin samples taken above the moisture front are those found in resin samples purged with a dry purge gas. Residual volatiles identified in resin smples taken below the moisture front are those found in resin samples treated with excess water that is when a substantial amount of water is found in the purge gas effluent. Volatiles identification can be done by Headspace and Chromatography or related known techniques.

The moisture front can be moved upward and downward from its initial location according the momentarily increase or reduction of the water injection rate. This feature is exploited in the control scheme shown in FIG. 4. The purpose of this control scheme is to maintain the moisture front within a small region inside the resin bed by modulating the water injection rate. This control scheme has the advantage of departing from the need to inject the exact amount of water to maintain and stablize the moisture front in one location of the resin bed. Generally the purge vessel is of the conventional type and is similar to that described with reference to FIG. 1. Hence, where applicable, like parts are designated by like reference numerals. Above the resin bed 16, 18 is positioned a probe 24 which is electrically connected to a conventional hygrometer. Likewise at the region where the moisture front 20 is to be established there is positioned a probe 26 which is electrically connected to hygrometer 28 which in turn is electrically and pneumatically connected to valve 30 which regulates water entry into the purge gas stream 12. The system described is based on conventional knowledge and equipment and hence no detailed description is necessary. By this technique, the moisture feed can be controlled by analyzing the purge gas for water content at the region where the moisture front needs to be established in a commercial scale purging vessel. If probe 26 measures a high level of water in the purge gas, valve 30 is throttled down to reduce the injection rate of water. This results in the recessing motion of the moisture front. When probe 26 detects a dry purge gas, it indicates that the moisture front has recessed below probe 26. Valve 30 is reopened to move the moisture front upward. Thus, the position of the moisture front is cycled within a small region of the resin bed near probe 26. The signal of probe 24 is used to drive a diverter valve to direct the purge gas effluent to the flare and away from the monomer recovery unit if a component of the moisture front control system fails.

The inert purge gas employed in the practice of the present invention may be any gas which is inert both to the resin being purged and the particular gaseous monomers being removed. The preferred purge gas is nitrogen although other gases inert in the process may be employed. It is preferred that the nitrogen content of the purge gas be at least about 90% and that oxygen be excluded from the purge gas. Other advantages of employing relatively pure nitrogen as a purge gas are that more hydrocarbon gases can be stripped from the resin particles and any pure nitrogen that may be discharged wit the exiting resins does not contribute to atmospheric emissions as would gases containing impurities. It is therefore preferred that the purge gas be pure nitrogen.

Monomer recovery can be effected by a variety of techniques. Since the catalyst and cocatalyst residues have been deactivated, the monomer recovery can be preferably recovered according to the process described in U.S. Pat. No. 4,372,758 and advantageously there is no need to further treat the monomers to remove water from the monomers.

EXAMPLE 1

An ethylene-hexene copolymer (density 0.930 g/cc; 2.0 melt index) is prepared by the gas phase process disclosed in U.S. Pat. No. 4,302,565 at a rate of 16.4 kg/hr.

The catalyst is made up of titanium chloride, magnesium chloride, THF, diethyl aluminum chloride and tri(normal)hexyl aluminum supported on a silica based support. Triethylaluminum is used as a cocatalyst and introduced in the reactor at a rate of 6.04 g/min.

After a depressurization step, the granular resin is transferred from the reactor to a purge vessel such as shown in FIG. 1 under an inert atmosphere. The resin is deposited atop an existing resin bed in the purge vessel operated near atmospheric pressure. The bed level is maintained constant by means of a conventional level control device coupled to a rotary valve installed at the bottom of the purge bin. Humidification of the nitrogen purge gas is effected by direct contact with water i.e., by passing nitrogen through a water bath. The total amount of water injected in the purge bin is controlled by varying an amount of dry nitrogen added to the wet nitrogen flow.

With a nitrogen flow rate of 9 g/min. having a water partial pressure of 0.03 atm., the purge gas effluent containing nitrogen and evolved monomer and comonomers has a substantial amount of water. The purge gas effluent has a dew point of $7°$ C. which necessitates a water removal process before monomer and comonomer can be recycled to the polymerization reactor.

EXAMPLE 2

An ethylene-hexene copolymer (density 0.930 g/cc; 2.0 melt index) is prepared by the gas phase process disclosed in U.S. Pat. No. 4,302,565 at a rate of 16.4 kg/hr.

The catalyst is made up of titanium chloride, magnesium chloride, THF, diethyl aluminum chloride and tri(normal)hexyl aluminum supported on a silica based support. Triethylaluminum is used as a cocatalyst and is introduced at a rate of 6.04 g/hr.

After a depressurization step, the granular resin is transferred from the reactor to a purge vessel such as shown in FIG. 1 under an inert atmosphere. The resin is deposited atop an existing resin bed in the purge vessel operated at near atmospheric pressure. The bed level is maintained constant by means of a conventional level control device coupled to a rotary valve installed at the bottom of the purge bin. Humidification of the nitrogen purge gas is effected by direct contact with water i.e., by passing nitrogen through a water bath. The total amount of water injected in the purge bin is controlled by increasing the amount of dry nitrogen added to the wet nitrogen flow.

With nitrogen flow rate of 9 g/min having a water partial pressure of 0.02 atmosphere, a stable moisture front was created and stabilized in the resin bed. As seen in FIGS. 2a and 2b, there was substantially no water vapor present in the nitrogen gas above the moisture front whereas below the moisture front the water concentration was substantially equal to the inlet nitrogen water concentration.

EXAMPLE 3

This example demonstrates how the moisture front can be controlled by means of analyzing the purge gas for water content at the region where the moisture front needs to be established in a commercial scale purging vessel.

Figure 4:
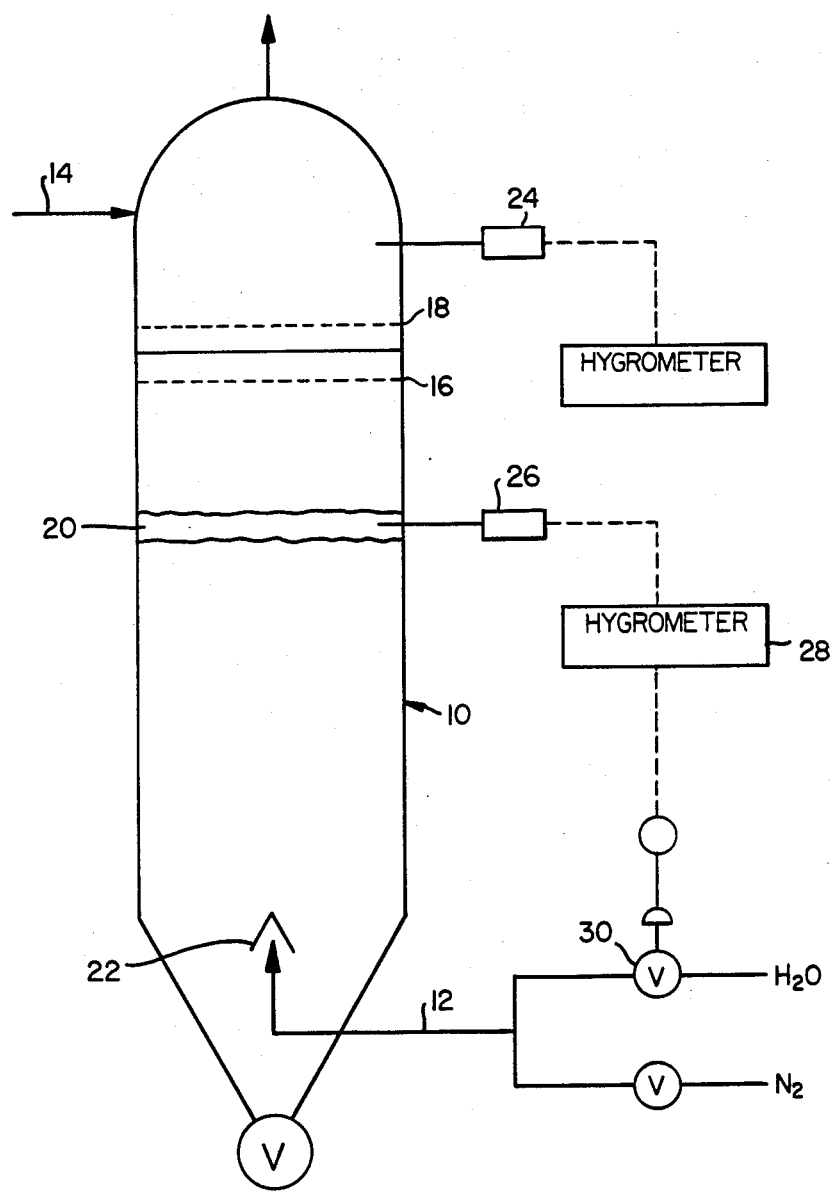
FIG. 4 shows a purge vessel indicating a control scheme for maintaining the moisture front inside the resin bed.
Figure 5:
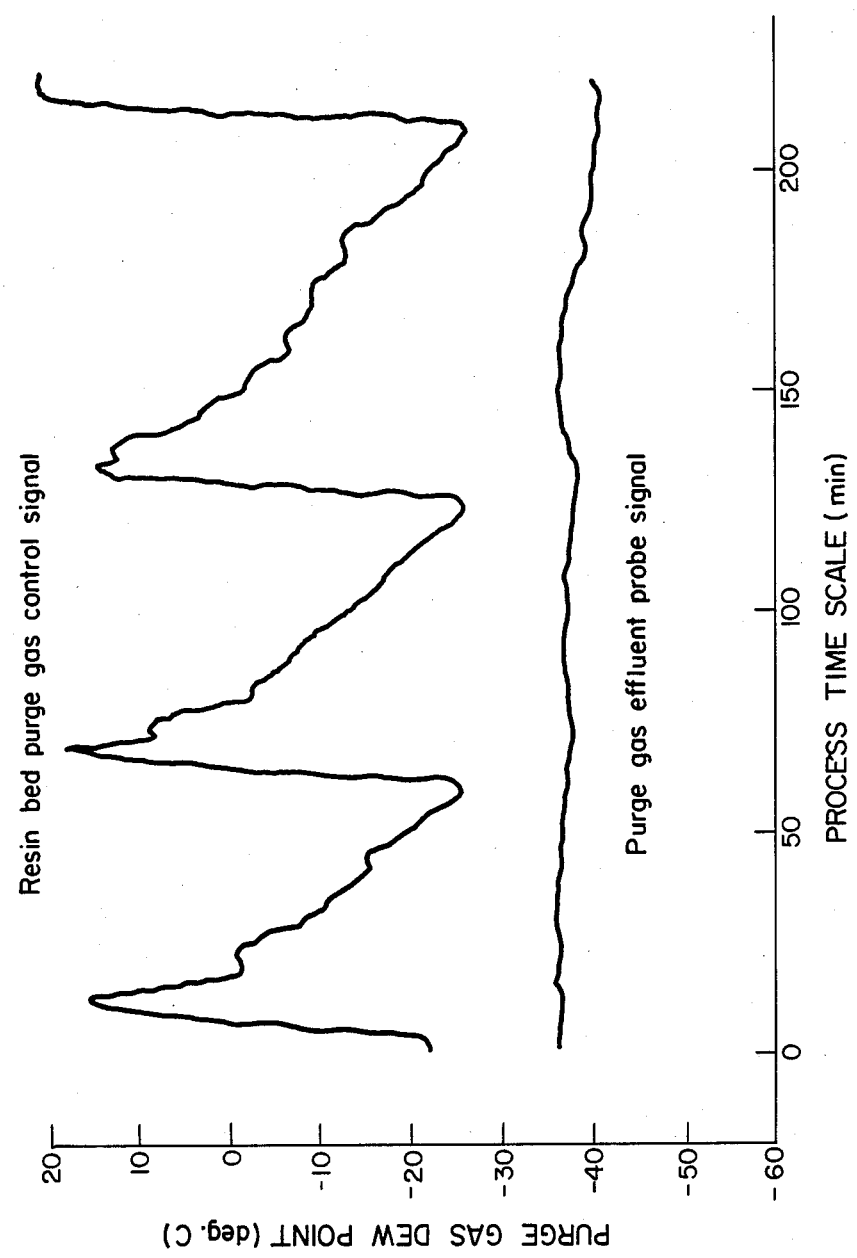
FIG. 5 illustrates the containment of the purge gas moisture inside the resin bed contained in the purge vessel of FIG. 4.

A resin and catalyst/cocatalyst as in Example 2 was utilized. The resin was produced at 2272 kg/hr and triethylaluminum was added to the reactor at a rate of 1.14 kg/hr. The purge vessel used was as shown in FIG. 4 and was about 9 meters in height, 1.4 m in diameter and the resin bed level was maintained at 7.3 m. The gas sample for control purposes was extracted at the 4 m level. As shown in FIG. 4, a control system was utilized which consisted of a hygrometer probe which was swept by a sample of the purge gas extracted at the region where the moisture front is to be established. The flow of water was controlled by a conventional valve and the flow of nitrogen was preset. Water injection was done by mixing steam with the nitrogen stream. The instantaneous water injection rate was in excess of 2.5 kg/hr. FIG. 5 shows the actual traces of the hygrometer probe signal of purge gas samples taken at the control region and in the purge bin space above the resin bed free surface. The upper trace corresponds to the purge gas dew point measured at the control location. The modulation seen in the control probe output shows the oscillatory nature of the moisture front in response to the water injection rate modulation. The bottom trace shows the measurement of the purge gas effluent dew point. This dew point was maintained below −35° C. throughout the trial which is sufficient to make it compatible with the monomer recovery unit preempting the poisoning of polymerization reactor.

What is claimed is:

1. A method for deactivating Ziegler-Natta catalysts and organometallic cocatalyst residues present in olefin polymer resins produced by the fluidized bed polymerization process which comprises conveying said olefinic polymer resins to a purge vessel in an inert gas stream to form a resin bed in said purge vessel, maintaining said resin bed substantially constant in said purge vessel, introducing an inert purge gas containing water into said purge vessel, said water and purge gas being regulated and calibrated so that said water present in said purge gas is in an amount sufficient to maintain a moisture front region in said resin bed whereby above said moisture front region purge gas is substantially free of water and below said moisture front region the amount of water present in said purge gas is substantially equal to the amount of water present in said purge gas introduced in said purge vessel and wherein deactivation of said catalyst and cocatalyst residues are effected in said moisture front region.

2. A proess according to claim 1 wherein said cocatalyst comprises organometallic compounds of Group I to III of the Periodic Table of elements.

3. A process according to claim 1 wherein said moisture front is maintained in said purge vessel by regulating the inert purge gas flow rate and water injection rate in said vessel responsive to the water partial pressure of said inert purge gas above said moisture front.

4. A process according to claim 1 wherein said inert gas stream comprises nitrogen.

5. A process according to claim 1 wherein said inert purge gas comprises nitrogen.

6. A process according to claim 1 wherein said polymer is a low pressure-polymerized, low density ethylene-hydrocarbon copolymer.

7. A method for deactivating Ziegler-Natta catalysts and cocatalyst residues present in solid low pressure-polymerized low density ethylene hydrocarbon copolymer which comprises conveying said solid low pressure polymerized low density ethylene hydrocarbon copolymer to a purge vessel in a nitrogen gas stream to form a resin bed in said purge vessel, maintaining said resin bed substantially constant in said purge vessel, introducing a nitrogen purge gas containing water into said purge vessel, countercurrently contacting said resin bed with said nitrogen purge gas, said water and purge gas being regulated and calibrated so that said water present in said purge gas is in an amount sufficient to maintain a moisture front region in said resin bed whereby above said moisture fron region the nitrogen purge gas is substantially free of water and below said moisture front region the water present in said nitrogen purge gas is substantially equal to the amount of water present in said nitrogen purge gas introduced in said purge vessel and wherein deactivation of said catalyst and cocatalyst residues are effected in said moisture front region.

8. A process according to claim 7, wherein said moisture front is maintained in said purge vessel by regulating the nitrogen purge gas flow rate and water injection rate in said vessel responsive to the water partial pressure of said nitrogen purge gas above said moisture front.

* * * * *